US012652354B1

(12) United States Patent
Brett-Atkin et al.

(10) Patent No.: US 12,652,354 B1
(45) Date of Patent: Jun. 9, 2026

(54) DYNAMIC GRID ELEMENTS FOR VIDEO LIVE STREAMING INTERFACES

(71) Applicant: StreamYard, Inc., Wilmington, DE (US)

(72) Inventors: William Brett-Atkin, Hampshire (GB); Jack Roper, Hertfordshire (GB); Adam Pugsley, London (GB); Alejandro Tatay de Pascual, Barcelona (ES)

(73) Assignee: Bending Spoons US Inc., New York, NY (US)

( * ) Notice: Subject to any disclaimer, the term of this patent is extended or adjusted under 35 U.S.C. 154(b) by 303 days.

(21) Appl. No.: 18/176,083

(22) Filed: Feb. 28, 2023

(51) Int. Cl.
| | |
|---|---|
| *H04M 3/56* | (2006.01) |
| *G06F 3/0482* | (2013.01) |
| *G06F 3/04845* | (2022.01) |

(52) U.S. Cl.
CPC .......... *H04M 3/563* (2013.01); *G06F 3/0482* (2013.01); *G06F 3/04845* (2013.01); *H04M 3/567* (2013.01)

(58) Field of Classification Search
CPC ..... H04M 3/563; H04M 3/567; G06F 3/0482; G06F 3/04845; G06T 11/00; G06V 20/41; G06V 20/46
USPC ......... 348/14.12, 14.03, 14.02, 14.08, 14.09, 348/14.1, 14.77, 14.78
See application file for complete search history.

(56) References Cited

U.S. PATENT DOCUMENTS

| | | | | |
|---|---|---|---|---|
| 11,196,963 | B1 * | 12/2021 | DiPasquale | ........... H04L 65/403 |
| 11,614,854 | B1 * | 3/2023 | Fitch | ................... H04L 65/1089 |
| | | | | 715/753 |

| | | | | |
|---|---|---|---|---|
| 2019/0377586 | A1 * | 12/2019 | Faulkner | ................. G06F 9/451 |
| 2021/0397402 | A1 * | 12/2021 | Ashkenazi | ............ H04L 63/105 |
| 2022/0345789 | A1 * | 10/2022 | Fowler | ............... G06Q 20/4015 |
| 2023/0169135 | A1 * | 6/2023 | Panikkar | .............. H04L 63/168 |
| | | | | 726/2 |
| 2024/0053879 | A1 * | 2/2024 | Wang | ....................... G09G 5/14 |

FOREIGN PATENT DOCUMENTS

| | | | | |
|---|---|---|---|---|
| WO | WO-2018169735 | A1 * | 9/2018 | ......... H04L 65/4038 |

OTHER PUBLICATIONS

Cisco, Connect to a Meeting Using Video Conferencing Systems or Applications (CMR Cloud User Guide), 2015, 12 Pages (Year: 2015).*

* cited by examiner

*Primary Examiner* — Duc Nguyen
*Assistant Examiner* — Carissa A Jones
(74) *Attorney, Agent, or Firm* — Erise IP, P.A.

(57) ABSTRACT

Systems, methods, and computer-readable media are provided for rendering a video live stream having one or more dynamic grid elements. The dynamic grid element may be a user interface element for displaying data streams that changes dynamically throughout a video live stream. As live stream participants join and leave the video live stream, the dynamic grid element may be adjusted to include containers to display the media data streamed by the live stream participants. The dynamic grid element may have a specified layout that defines how containers are added when participants join. Participants may also be assigned a priority to a container that reserves the container for the participant. A fill order may also be defined for the dynamic grid element indicating an order in which participants are added to the container.

20 Claims, 9 Drawing Sheets

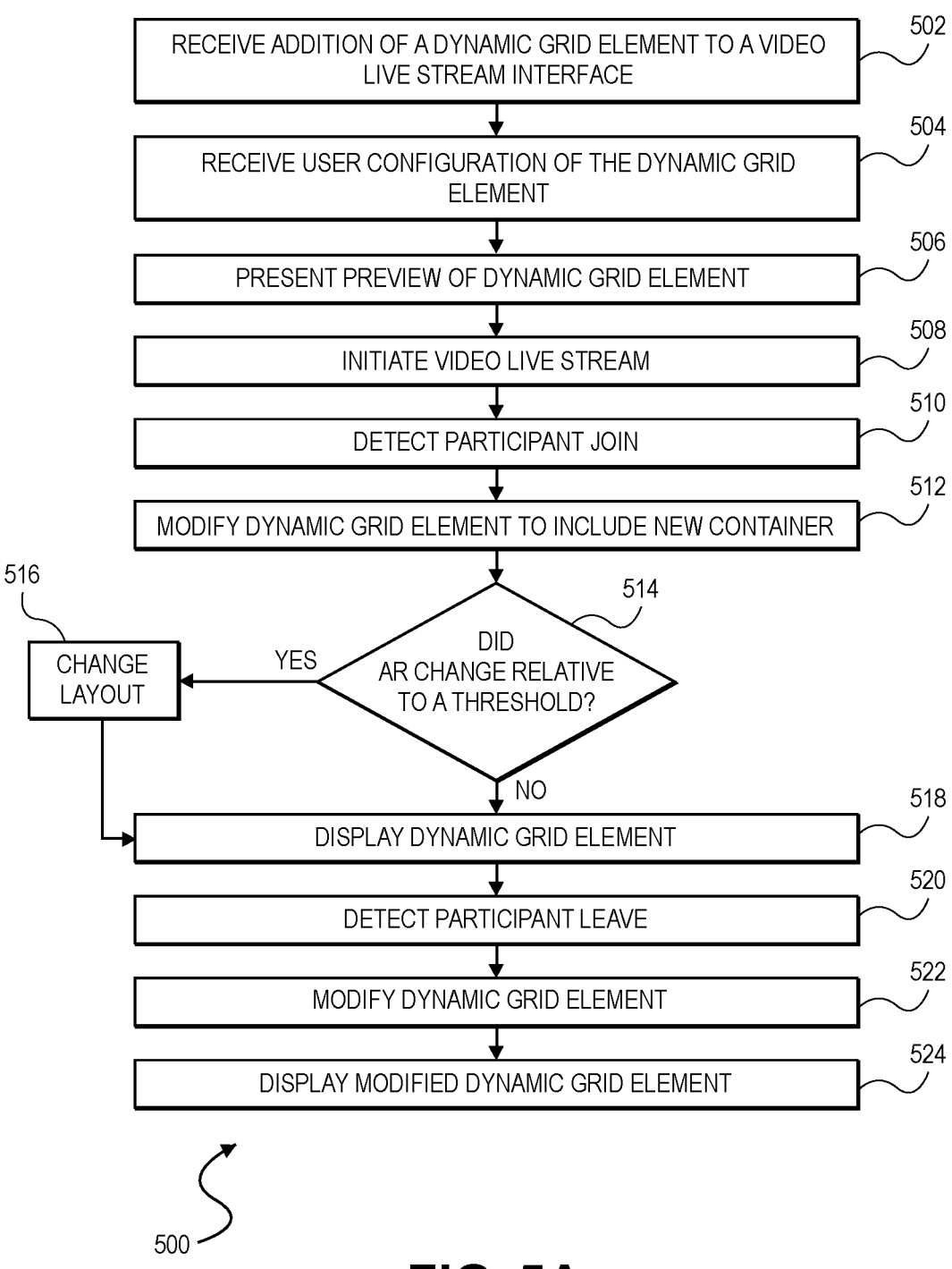

RECEIVE ADDITION OF A DYNAMIC GRID ELEMENT TO A VIDEO LIVE STREAM INTERFACE    502

RECEIVE USER CONFIGURATION OF THE DYNAMIC GRID ELEMENT    504

PRESENT PREVIEW OF DYNAMIC GRID ELEMENT    506

INITIATE VIDEO LIVE STREAM    508

DETECT PARTICIPANT JOIN    510

MODIFY DYNAMIC GRID ELEMENT TO INCLUDE NEW CONTAINER    512

516    CHANGE LAYOUT

YES    514    DID AR CHANGE RELATIVE TO A THRESHOLD?

NO

DISPLAY DYNAMIC GRID ELEMENT    518

DETECT PARTICIPANT LEAVE    520

MODIFY DYNAMIC GRID ELEMENT    522

DISPLAY MODIFIED DYNAMIC GRID ELEMENT    524

DYNAMIC GRID ELEMENTS FOR VIDEO LIVE STREAMING INTERFACES

TECHNICAL FIELD

Embodiments of the present disclosure relate to video live streaming. More specifically, embodiments of the present disclosure relate to dynamic grid elements that automatically adjust as live stream participants join and leave a video live stream.

Typical video live streaming services provide basic customization of video stream layouts. For example, a video live stream service may provide the ability to move video windows around an interface. However, outside of these basic customization features, customization of video stream layouts is lacking. Additionally, such video stream layouts fail to adequately adjust to changes in the video live stream, such as a participant leaving the video stream.

SUMMARY

In some aspects, the techniques described herein relate to one or more non-transitory computer-readable media storing computer executable instructions that, when executed by at least one processor, perform a method for rendering a video live stream interface having one or more dynamic grid elements, the method including: receiving, from a user, a first selection of a dynamic grid element to add to a video live stream interface; responsive to receiving the first selection, adding the dynamic grid element to the video live stream interface; receiving, from the user, a second selection of a layout for the dynamic grid element; initiating a video live stream; responsive to a first participant joining the video live stream, rendering video data from the first participant in a first container of the dynamic grid element; responsive to a second participant joining the video live stream: modifying the dynamic grid element within the video live stream interface to include a second container, wherein the dynamic grid element is modified based on the layout; and rendering video data from the second participant in the second container.

In some aspects, the techniques described herein relate to a computer-readable media, further including: responsive to one of the first participant or the second participant disconnecting from the video live stream: removing one of the first container or the second container from the dynamic grid element.

In some aspects, the techniques described herein relate to a computer-readable media, further including receiving, from the user, a third selection of a size of the dynamic grid element.

In some aspects, the techniques described herein relate to a computer-readable media, wherein modifying the dynamic grid element to include the second container includes decreasing a size of the first container while maintaining a first aspect ratio of the first container to fit within the size of the dynamic grid element, wherein the second container includes a second aspect ratio equivalent to the first aspect ratio.

In some aspects, the techniques described herein relate to a computer-readable media, wherein modifying the dynamic grid element to include the second container includes cropping the first container to fit within the size of the dynamic grid element.

In some aspects, the techniques described herein relate to a computer-readable media, further including: receiving a third selection of a fill order for the dynamic grid element;

and assigning the first participant and the second participant to the first container and the second container based on the fill order.

In some aspects, the techniques described herein relate to a computer-readable media, wherein the layout includes one of a horizontal layout, a vertical layout, or a grid layout, and further including receiving, from the user, a third selection of an alignment for the layout.

In some aspects, the techniques described herein relate to a method for rendering a video live stream interface having one or more dynamic grid elements, the method including: receiving, from a user, a first selection of a dynamic grid element to add to a video live stream interface, wherein the dynamic grid element includes a plurality of containers configured to render data from a data stream; responsive to receiving the first selection, adding the dynamic grid element to the video live stream interface; receiving, from the user, a second selection of a priority for a first participant to a container of the plurality of containers; rendering a video live stream based on the video live stream interface; responsive to the first participant joining the video live stream, adding the first participant to the container of the plurality of containers based on the priority; and rendering video data for the first participant in the container.

In some aspects, the techniques described herein relate to a method, further including: wherein the container is associated with a unique URL; and wherein the method further includes: transmitting the unique URL to the first participant, the unique URL providing access to the container.

In some aspects, the techniques described herein relate to a method, wherein receiving user configuration of the dynamic grid element includes receiving an alignment of the plurality of containers and a layout for the dynamic grid element.

In some aspects, the techniques described herein relate to a method, wherein adjusting the dynamic grid element includes resizing the dynamic grid element, wherein the dynamic grid element is resized based on the alignment of the plurality of containers and the layout for the dynamic grid element.

In some aspects, the techniques described herein relate to a method, further including: receiving an instruction to add an auxiliary data stream to a second container of the dynamic grid element, wherein the auxiliary data stream includes one of: a screen share, a video feed, or an image; and responsive to receiving the instruction: modifying the dynamic grid element to include the second container; and causing display of the auxiliary data stream.

In some aspects, the techniques described herein relate to a method, further including: responsive to receiving user configuration of the dynamic grid element, causing display of a preview for the dynamic grid element.

In some aspects, the techniques described herein relate to a method, wherein adding the first participant to the container includes removing another participant from the container.

In some aspects, the techniques described herein relate to a system for rendering a video live stream including one or more dynamic grid elements, including: at least one data store; and at least one processor programmed to carry out computer-executable instructions, including: causing display of a video live stream interface, the video live stream interface including a dynamic grid element and at least one other user interface element, wherein the dynamic grid element includes a first container, the first container configured to render data associated with a data stream; rendering the data stream within the first container; responsive to a second data stream being added to the video live stream: adding a second container to the dynamic grid element, and rendering the second data stream in the second container.

In some aspects, the techniques described herein relate to a system, wherein the dynamic grid element includes grid layout having at least one row of containers and at least one column of containers.

In some aspects, the techniques described herein relate to a system, wherein the instructions further include: responsive to the dynamic grid element having an aspect ratio with a height below a threshold height value, changing the grid layout to a horizontal layout.

In some aspects, the techniques described herein relate to a system, wherein the instructions further include: responsive to the dynamic grid element having an aspect ratio with a width below a threshold width value, changing the grid layout to a vertical layout.

In some aspects, the techniques described herein relate to a system, wherein the instructions further include: receiving, from a user, a selection of a media quality setting to apply to a container of the dynamic grid element; and responsive to receiving the selection, applying the media quality setting to each container in the dynamic grid element.

In some aspects, the techniques described herein relate to a system, wherein the instructions further include: after an end of the video live stream, receiving a modification to the dynamic grid element, and generating a recording of the video live stream, the recording including the modification to the dynamic grid element.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein:

FIG. 5A illustrates an exemplary method for rendering a video live stream having one or more dynamic grid elements for some embodiments of the present disclosure.

Figure 1:
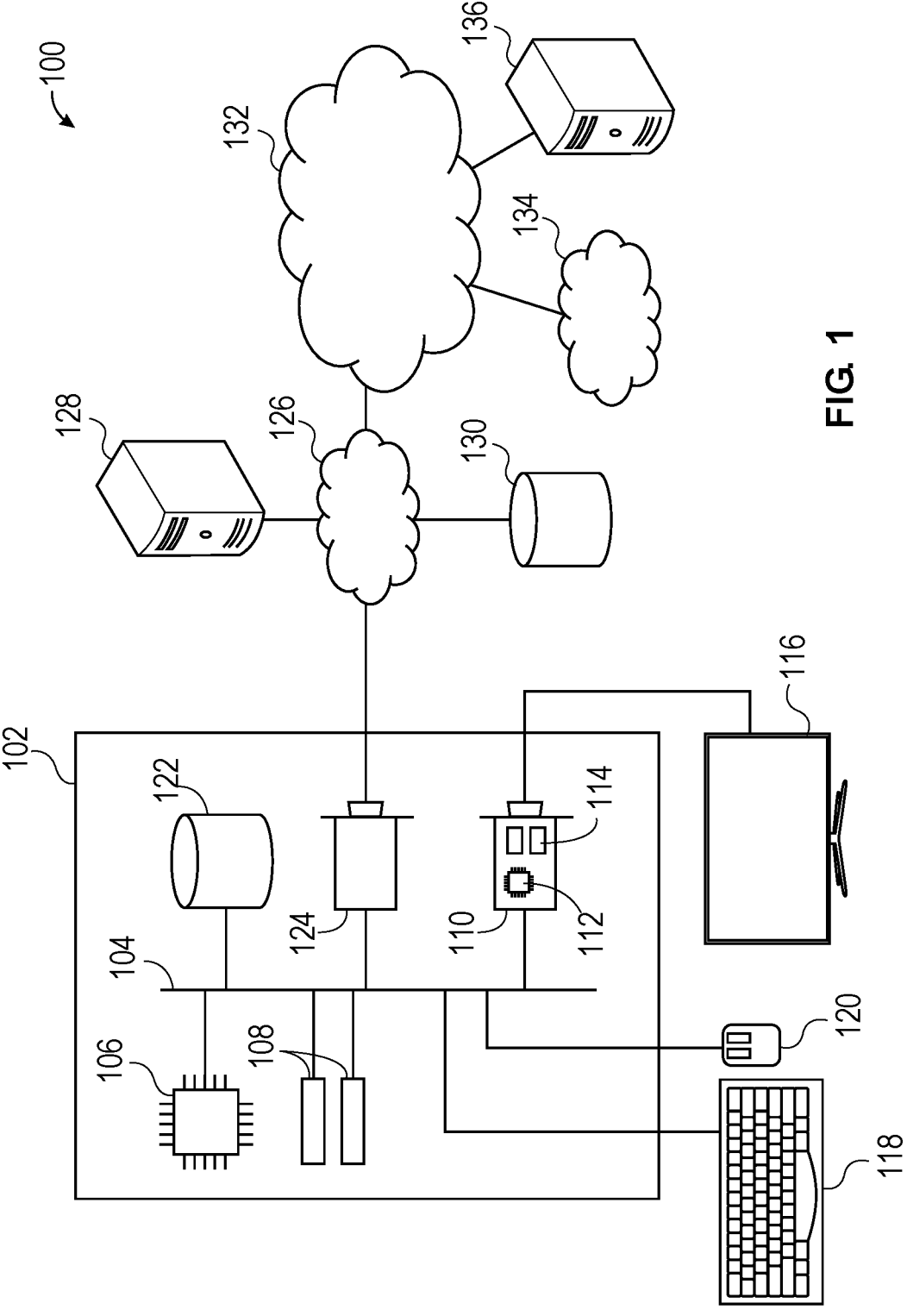
FIG. 1 depicts an exemplary hardware platform relating to certain embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments herein are generally directed to video live streaming and customizable live streaming interfaces that include one or more dynamic grid elements configured to dynamically adapt to changes in the video live stream. A dynamic grid element may comprise one or more containers, and each container may be configured to display data from a data source. For example, containers may display video data from live stream participants. As new data streams are added to the video live streams, new containers may be provisioned and added to the dynamic grid element. The dynamic grid element may then adjust to include the new containers based on various settings. Accordingly, embodiments herein provide for improved video live streaming interfaces The dynamic grid element may provide for a single user interface element to be added to a user interface that can accommodate various changes to the live stream such that a user does not have to manually adjust the interface as participants leave and join a video live stream.

Turning first to FIG. 1, an exemplary hardware platform 100 for certain embodiments of the present disclosure is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. CPU 106 (also called a processor) may be configured to execute computer-executable instructions. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-executable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2A:
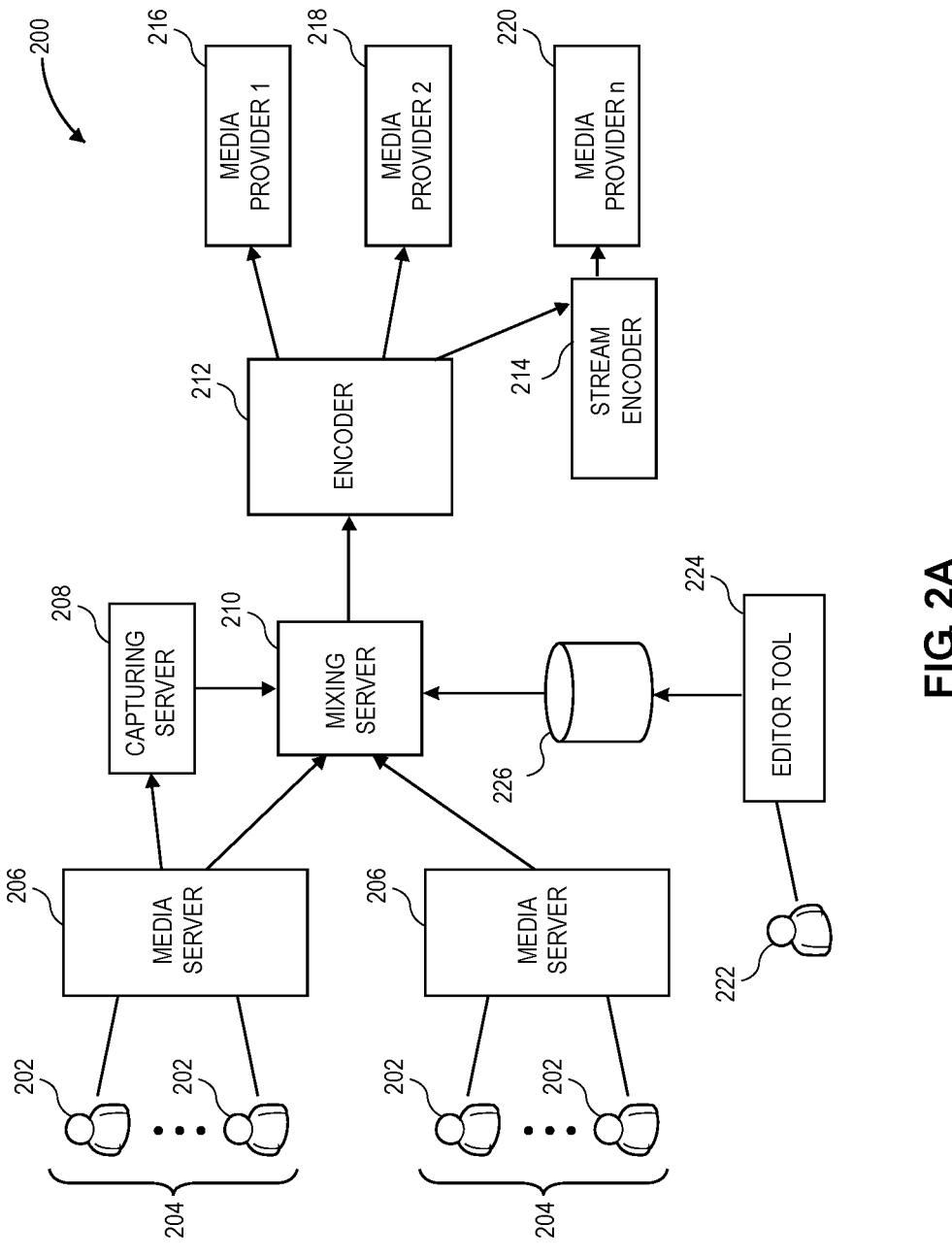
FIG. 2A illustrates elements of a system for carrying out embodiments of the present disclosure.

FIG. 2A illustrates elements of a system 200 for carrying out embodiments of the present disclosure. In some embodiments, users 202 are grouped into or more instances of studio 204 for connecting to a single instance of media server 206. In these embodiments, associating a group of users 202 in a particular instance of studio 204 with a single instance of a media server 206 has the benefit of eliminating a need for multiple instances of media server 206 to perform inter-server communication. In these embodiments, a number of users 202 in a particular instance of studio 204 is small enough (on the order of ten or so) that a single instance of media server 206 is adequate to receive from and transmit various video streams associated with studio 204.

In some embodiments, users 202 may use devices with low computational power to record a single stream of video and stream that video to media server 206. In some embodiments, where users 202 are on a relatively low-bandwidth connection, a lossy compression may be employed so that a particular video stream is able to keep up within the constraints of the low-bandwidth connection. In some such embodiments, where lossy compression is employed for the live stream, a lossless version of the recording is persisted locally, for example, on a storage medium associated with a client device of user 202 that has only a low-bandwidth connection. In such embodiments, once the live streaming has concluded, or in the case where a high-bandwidth connection is encountered, the lossless recording of the recorded video is uploaded to media server 206 and subsequently forwarded on to capturing server 208. In some embodiments, the lossless recording of the recorded video is transmitted directly to capturing server 208. In alternative embodiments, where user 202 has a high-bandwidth connection, the lossless recording may be streamed substantially simultaneously with the compressed stream that is used to render a composite video stream.

In some embodiments, the video streams may be mixed and rendered on a web page by a simulated browser in connection with the mixing server. Embodiments are contemplated in which a first communication protocol is used for receiving individual video streams from the plurality of participant users and a second communication protocol distinct from the first is used for providing the mixed video stream to a multitude of live stream viewing users, which may optionally receive live streaming video from one or more media providers.

As further described in connection with FIG. 2A below, in some embodiments, mixing server 210 receives multiple streams and other multimedia assets and descriptors to render a composite video stream. In some such embodiments, mixing server 210 renders the composite video in connection with a simulated-display browser rendering engine running on mixing server 210. A simulated-display browser rendering engine operates like a web browser in that it renders a web page based on a rendering template such as, for example, Hypertext Markup Language (HTML) or other web-based markup in order to render various components of a mixed set of video streams, generating a single stream from the individual streams and any associated text and graphics. In some embodiments, the simulated display browser may be referred to as a headless browser. The simulated display browser, however, is not necessarily connected to a physical display. Instead (or in addition), the visual components of the associated simulated display may be mapped to a storage location or memory associated with mixing server 210 in such a way that the simulated display can nevertheless be subject to a simulated screen capture process, whereby a single video stream video of the simulated display is captured and persisted to a shared memory associated with mixing server 210. In some embodiments, the shared memory may be an operating-system-based file system that implements concurrency controls so that multiple processes may read from the composite video stream while mixing server 210 continually adds contents to the video stream.

Mixing server 210 may be a dedicated server, a shared server, a virtual machine instance in a cloud computing environment, or any other form of computing device discussed above with respect to FIG. 1. Mixing server 210 may also be implemented in connection with containers (e.g., DOCKER-style containers) as provided by platform-as-a-service (PaaS) technologies with virtualized host operating systems or with any number of serverless PaaS technologies.

Although a single instance of mixing server 210 is depicted, embodiments with multiple such services are also contemplated to provide scale, redundancy and/or isolation between different instances of a composite video live streaming platform. For example, a live stream organizer hosting a private live stream in which viewers register under a non-disclosure agreement may not wish to have the confidential live stream hosted on the same system as another live stream organizer's live stream, for security reasons. Moreover, a live stream with a large number of participants or potential guests may require multiple instances of mixing server 210 for scaling purposes to provide sufficiently performant interactive response times that are adequate to provide an acceptable user experience.

In some embodiments, once the simulated browser rendering engine associated with mixing server 210 has rendered composite video frames and the rendered composite video frames have been captured and persisted to a shared memory associated with mixing server 210, the captured frames may be encoded in connection with encoder 212 into an encoded format that is compatible with various media providers such as media provider 216, media provider 218, and media provider 220. These various media providers may correspond to any type of social media platform that facilitates live streaming. In some embodiments, encoder 212 may be implemented in connection with a video encoding process that receives a stream of frames and produces an encoded video stream. For example, one such video encoding process, FFmpeg, provides a suite of libraries and programs for processing multimedia files and streams. In some alternative embodiments, after encoder 212 encodes the captured frames, a subsequent video stream encoding process 214 carries out post-processing encoding to, for example, encode additional information or change a video format or associated compression scheme associated with the composite video stream being provided to media provider 220.

In some embodiments, an editing user 222 operates an editor tool 224 to create one or more custom user-defined video live stream interfaces. In some embodiments, the custom user-defined video live stream interfaces may be stored within an interface template repository 226, as shown, or other data store storing interface templates. In some embodiments, the interface template repository 226 may be communicatively coupled to the mixing server 210 such that one or more predefined interface templates may be selected for a video communication session. Accordingly, video live streams may be rendered based on the selected interface template. In some embodiments, the interface template may be selected from one or more preconfigured interface templates and one or more custom user-defined interface templates stored on the interface template repository 226.

Figure 2B:
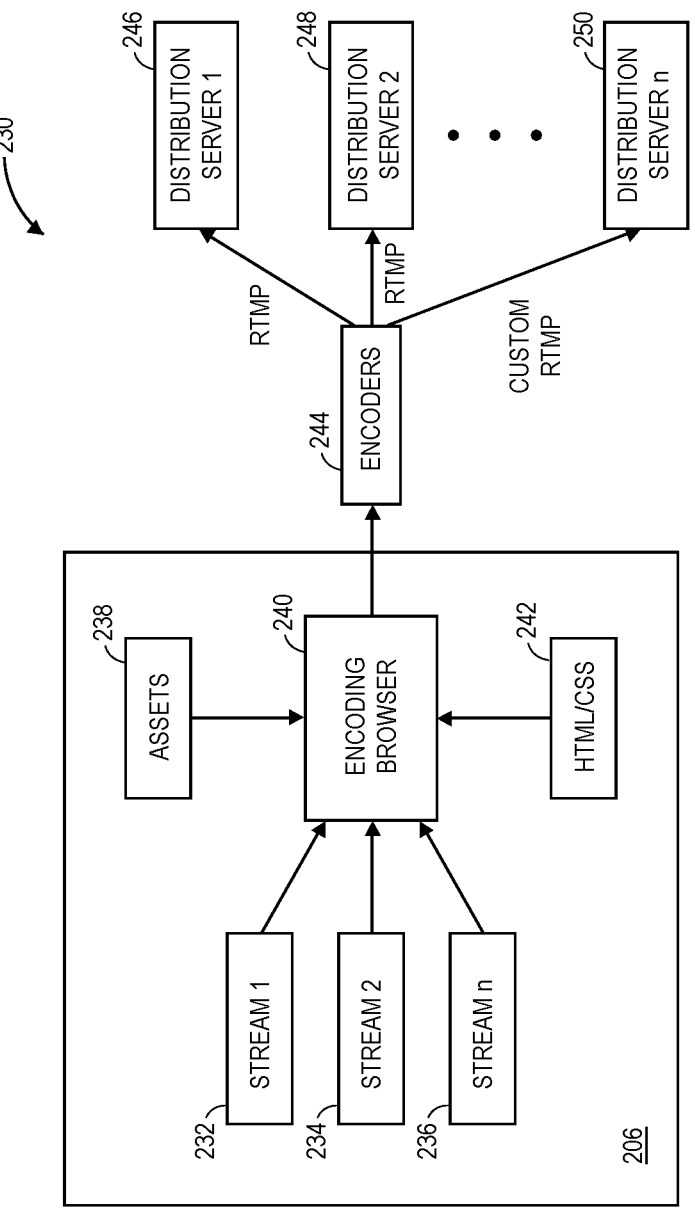
FIG. 2B illustrates elements of a system for carrying out embodiments of the present disclosure.

FIG. 2B illustrates elements of a system 230 for carrying out alternative embodiments of the present disclosure. System 230 depicts an expanded view of media server 206 in which media server 206 takes on the roles of media server as well as mixing server 210 and capturing server 208 for ease of description. In these embodiments, multiple streams such as stream 232, stream 234, and stream 236 are received into media server 206 and processed in connection with encoding browser 240. In some embodiments, encoding browser 240 is a simulated display browser that relies on a web browser rendering engine to render a simulated web page, in which the rendered web page is not necessarily sent to a physical display but merely rendered in a memory that could be forwarded to a physical display but could also be further processed and/or captured. In some embodiments, encoding browser 240 employs a modified version of a browser rendering engine, such as CHROMIUM, that renders its display to a virtual display server such as a graphical windowing display server. It is an advantage of such an approach that the existing layout and video decoding capabilities of encoding browser 240 can be utilized rather than writing a custom video decoder/layout/rendering engine for each layout of video that might be used in the video event hosting service. In some such embodiments, a network-capable sound server is employed to process an audio stream associated with the audiovisual streams received by encoding browser 240. In other embodiments, a voice chat mixing service such as OPENTALK is used to process the audio streams for communication among the participants as well as the audio portion of the combined video stream.

In some embodiments, a browser window layout as rendered and captured in connection with encoding browser 240 is formatted in connection with HTML and/or CSS from formatting source 242. Additionally, or in the alternative, assets 238 are provided to encoding browser 240 so that encoding browser 240 may render various graphical assets in connection with the rendered composite video stream, where assets 238 may represent backgrounds, logos, and/or other graphics to augment the composite video stream and provide a consistent branding experience, etc.

In some embodiments, the output from encoding browser 240 is provided to subsequent downstream encoders 244. As described above in connection with FIG. 2A, such encoders may provide an output in a real-time messaging protocol (RTMP) format as needed by social media platforms or other distribution servers such as distribution server 246, distribution server 248, or distribution server 250. As shown in FIG. 2B distribution server 246 receives a live stream according to an RTMP protocol corresponding to distribution server 246 and distribution server 248, which may be, for example YOUTUBE. Also illustrated is a custom RTMP protocol for sending a live stream to distribution server 250, which may receive an arbitrary RTMP live stream for distributing to other users.

Figure 3A:
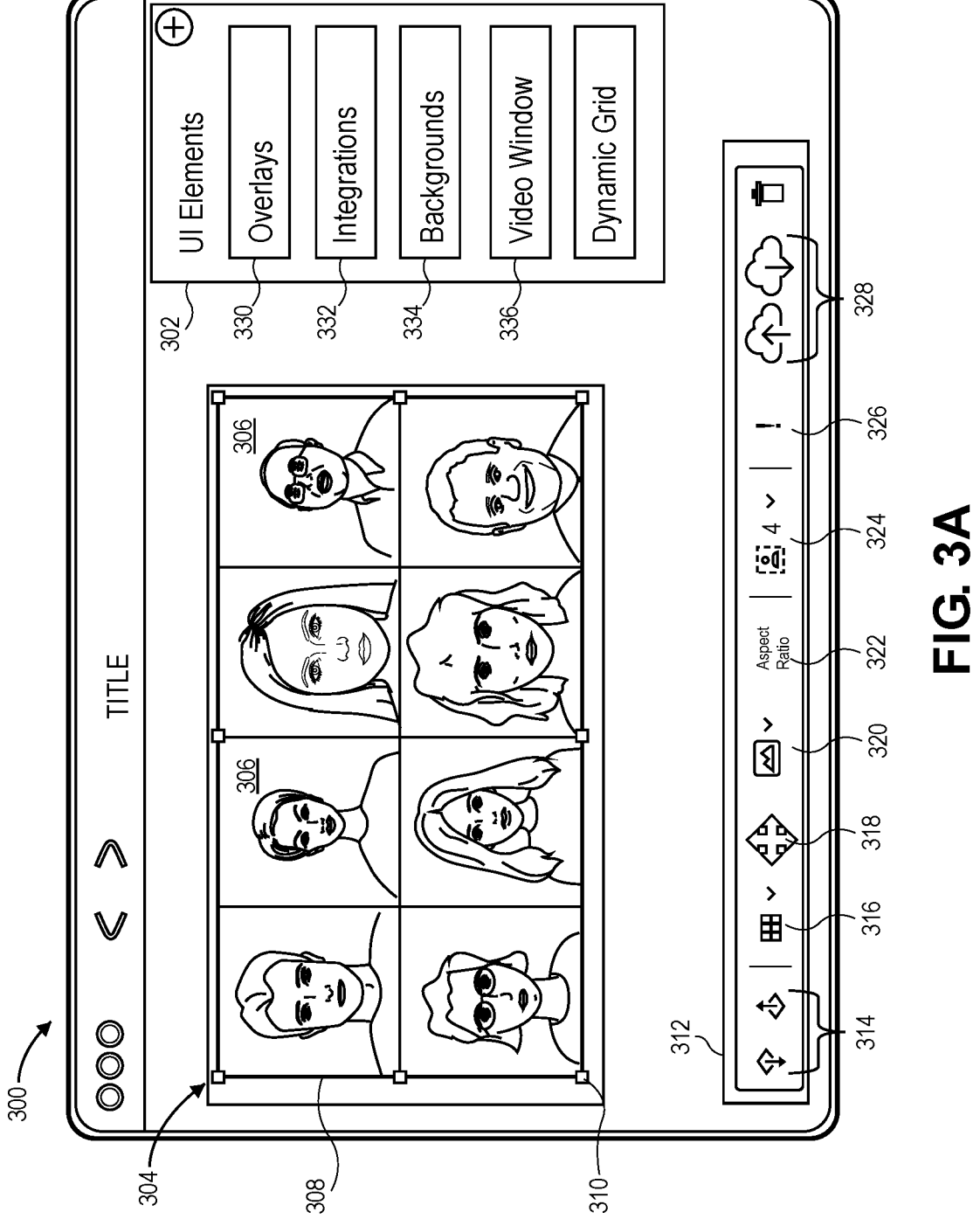
FIG. 3A illustrates an editor interface for creating a video live stream interface for some embodiments of the present disclosure.

FIG. 3A illustrates an editor interface 300 for generating a customized layout for a video live stream for some embodiments of the present disclosure. In some embodiments, editor interface 300 corresponds to editor tool 224 described above. Editor interface 300 may generally be used by a user to configure a video live stream interface for a video live stream such that the video stream is rendered according to the video stream layout. Editor interface 300 may comprise various options for customizing the video stream layout. In some embodiments, editor interface 300 comprises UI elements 302 that may be added to the video stream layout. For example, as shown, UI elements 302 may comprise a dynamic grid element, a video window element, a background element, an integrations element, an overlay element, which are discussed in further detail below. Generally, UI elements 302 may comprise any user interface element that may be added to editor interface 300.

One or more instances of dynamic grid element 304 may be added to a video live stream interface using editor interface 300. In some embodiments, dynamic grid element 304 is a user interface element that may be dynamically adjusted during a video live stream based on various events and settings. In some embodiments, a container 306 comprises one or more containers 306, each of the one or more containers 306 configured to display data for the video live stream. For example, a container 306 may be configured to display video data from a live stream participant as part of the video live stream. As another example, a container 306 may be configured to render screen shared data transmitted by a video live stream participant. Thus, in some embodiments, multiple containers 306 may be associated with a single participant. As yet another example, a container 306 may be configured to stream data from a live stream integration, such as a third-party polling integration. Auxiliary data that may be associated with a container 306 for display in a video live stream include, but are not limited to, RTMP ingest data, static images, video files, and the like. In some embodiments, the number of containers 306 in a dynamic grid element 304 is in the range of 1 to 10. Generally, any number of containers 306 may be added to a dynamic grid element 304 without departing from the scope hereof. While containers 306 are depicted as generally rectangular shaped user interface elements, it will be appreciated that containers 306 may take various other shapes. Additionally, as discussed further below, user interface elements may be added over containers 306 (e.g., on a layer above the container 306) to mask portions of the container 306 to adjust the display shape of a container 306.

Once added to the video stream layout, a dynamic grid element 304 may be customized to the preferences of editing user 222. In some embodiments, the positioning of dynamic grid element 304 may be adjusted. For example, editing user 222 may drag and drop dynamic grid element 304 to a desired position within editor interface 300. In some embodiments, dynamic grid element 304 can be snap-aligned to various portions of the user interface (e.g., to an edge of the interface). Similarly, dynamic grid element 304 may be aligned (e.g., left-aligned, center-aligned, etc.) to any other instance of UI element 302 in the live stream interface.

In some embodiments, a bounding box 308 having handles 310 is provided for resizing the dynamic grid element 304. Both freeform and uniform resizing of dynamic grid element 304 may be provided. A user may click-and-drag a handle 310 to adjust the size of the dynamic grid element 304. Corner handles 310 may be used to uniformly resize the dynamic grid element 304. In some embodiments, each container 306 within a dynamic grid element 304 can be individually resized such that containers 306 in a dynamic grid element 304 have differing sizes. Containers 306 may also be reordered within dynamic grid element 304 using editor interface 300. For example, editing user 222 may drag and drop the rightmost container 306, and move the container 306 to a new position in the dynamic grid element 304. The other containers 306 may then automatically reposition based on the new position of the moved container 306.

In some embodiments, a dynamic grid toolbar 312 is provided for configuring the dynamic grid element 304. In some embodiments, dynamic grid toolbar 312 includes layers 314, grid settings 316, fit/fill settings 320, alignment 318, aspect ratio 322, preview 324, priority 326, and download/upload 328. In some embodiments, layers 314 allows for the layer that dynamic grid element 304 resides on to be adjusted. For example, the dynamic grid element 304 may be moved up or down a layer user layers 314. In some embodiments, the video stream layout is configured with three layers. UI elements on a top layer will cover UI elements in the same position in a middle layer and a lower layer. UI elements on a middle layer will cover UI elements in the same position on the lower layer. In some embodiments, each UI element in the video stream layout can be assigned to a layer. For example, as discussed further below, an overlay UI element may be added to a topmost layer and may display a nameplate for a participant in a container 306. As another example, background imagery for the video stream may be added to the bottom layer such that all other UI elements in the video stream are displayed on top of the background imagery. While the preceding examples have been discussed with respect to a bottom, middle, and top layer, it will be appreciated that additional or fewer layers may be used without departing from the scope hereof. Further, in some embodiments, the customizing user can define the number of layers for the video stream layout.

In some embodiments, editing user 222 is alerted when adding a user interface element that will obscure one or more other user interface elements. For example, if a first user interface element (e.g., a dynamic grid element 304) is added to a layer above a second user interface element and will therefore obscure at least a portion of the second user interface element when the video live stream interface is rendered, editing user 222 may be alerted. In some embodiments, the obscured element is highlighted in editor interface 300 to provide a visual indication to editing user 222. If the first user interface element obscures more than one other element, each of the elements may be highlighted or otherwise called out to editing user 222.

In some embodiments, grid settings 316 allow for the customizing user to select a layout type for the dynamic grid element 304. In some embodiments, the layout type includes a default grid layout, a horizontal layout, a vertical layout, or a Masonry grid layout. Other grid layouts may be used without departing from the scope hereof. The horizontal layout may comprise an arrangement of containers 306 horizontally in a single row. The vertical layout may comprise an arrangement of 306 vertically in a single column. The default grid layout may comprise an arrangement of containers 306 in a grid having both columns and rows. Examples of the default grid layout and the horizontal layout are provided below in FIG. 3B.

In some embodiments, dynamic grid toolbar 312 comprises alignment 318 via which the editing user 222 may define an alignment for the layout selected using grid settings 316. In some embodiments, the horizontal layout can be left-aligned, right-aligned, or center aligned. The left-aligned horizontal grid layout may have a first container 306 proximal to a left border of editor interface 300, and newly-added containers 306 may be added to the right of a preceding container 306 in a row. Likewise, the right-aligned horizontal layout may have a first container 306 proximal to a right border of editor interface 300, and newly-added containers 306 may be added to the left of a preceding container 306 in a row. In some embodiments, editing user 222 can define a distance away from the edge that the first container in the left or right-aligned horizontal layout begins. For example, editing user 222 may define that the right edge of the first container 306 in a right-aligned horizontal layout is 100 pixels from the right border of editor interface 300. The center-aligned horizontal layout may have a first container 306 located in a center of the editor interface 300. Newly-added containers 306 may be added to the left and the right of the center container 306 to fill up the row.

In some embodiments, the vertical layout can be top-aligned, bottom-aligned, or center-aligned. The top-aligned vertical layout may have a first container 306 proximal to a top border of editor interface 300, and newly-added containers 306 may be added below a preceding container in a column. Likewise, the bottom-aligned vertical layout may have a first container 306 proximal to a bottom border of editor interface 300, and newly-added containers 306 may be added above a preceding container 306 in a columnar manner. Similarly, the center-aligned vertical layout may have a first container 306 located near a vertical center of the video stream interface, and newly-added containers 306 may be added above and below the center containers 306 to fill the column.

In some embodiments, the default grid layout can have a left-alignment, a right alignment, a top alignment, a bottom alignment, a center alignment, or a combination thereof. The right alignment may align the rightmost containers 306 to a right edge of dynamic grid element 304. The left alignment may align the leftmost containers 306 to a left edge of dynamic grid element 304. The top alignment may align the topmost containers 306 to a top edge of dynamic grid element 304. The bottom alignment may align the bottom-most containers 306 to a bottom of dynamic grid element 304. The center alignment may center all containers 306 within dynamic grid element 304. Combinations of the aforementioned default grid layout alignments may be provided in some embodiments. For example, a top-right alignment may be set such that the topmost containers 306 are aligned to a top of containers 306, and the right most containers 306 are aligned to a right of dynamic grid element 304.

Dynamic grid toolbar 312 may further comprise fit/fill settings 320. In some embodiments, editing user 222 can select one of the fill configuration or the fit configuration. In some embodiments, the fit/fill configurations define how existing containers 306 are adjusted within dynamic grid element 304 as containers 306 are added and removed. When the fill configuration is selected, the containers 306 may be sized to fill the dynamic grid element 304. In some embodiments, the containers 306 are cropped to accommodate new containers 306 while still filling the dynamic grid element 304. The containers 306 may be cropped horizontally or vertically.

When the fit configuration is selected, the size of dynamic grid element 304 may change as containers 306 are added and removed from the dynamic grid element 304 to fit the containers 306 without changing the aspect ratio thereof. In some embodiments, the size of dynamic grid element 304 does change as containers 306 are added and removed from a dynamic grid element 304. In other embodiments, the size of dynamic grid element 304 changes when the fit configuration is selected. Thus, in the fit configuration, the source may maintain an original aspect ratio as containers 306 are added and removed from the dynamic grid element 304.

In some embodiments, a "best fit" configuration is also provided. Like the fit configuration described above, the best fit configuration may be configured to maintain an original aspect ratio of a container 306 as new containers 306 are added. In contrast to the fit configuration, the best fit configuration may be configured to adjust an aspect ratio of containers 306 responsive to a threshold number of containers 306 being added to a dynamic grid element 304. The threshold number of containers 306 may be defined by editing user 222 and/or may be determined based on a size of dynamic grid element 304. When the threshold number of containers 306 is reached, the containers may be cropped (e.g., horizontally or vertically) to fit within the dynamic grid element 304. In some embodiments, the containers 306 are cropped to an aspect ratio that is optimized for a largest-sized container 306 within the dynamic grid element 304 that allows viewers to effectively view the participants displayed within the containers 306. For example, the system may prevent containers 306 from being cropped to an aspect ratio that is known to make it difficult to view the persons displayed in the containers.

In some embodiments, dynamic grid toolbar 312 comprises aspect ratio 322. In some embodiments, aspect ratio 322 allows for the editing user 222 to set aspect ratio parameters for containers 306 in the dynamic grid element 304. For example, in the fit configuration, aspect ratio 322 may be used to define the aspect ratio that each container 306 maintains as dynamic grid element 304 changes. As another example, the aspect ratio 322 may be used to define when a switch from a first grid layout to a second grid layout occurs. For example, editing user 222 may select a default grid layout for the dynamic grid element 304 using grid settings 316 as discussed above. Additionally, the editing user 222 may also define a minimum width aspect ratio at which the default grid layout changes to a vertical layout. For example, if the width of the aspect ratio falls below 10:21, dynamic grid element 304 may automatically change to the vertical layout. It is contemplated that various other triggering events may be defined to cause a change in one or more settings for the dynamic grid element 304 during a video live stream. For example, if the default grid layout is selected, and enough containers 306 are added to the dynamic grid element 304 to add a third row to the dynamic grid element 304, the user may define that, instead of adding the third row, the dynamic grid element 304 should switch to the horizontal or vertical layout. Similarly, embodiments are contemplated in which a specific participant joining or leaving the video live stream causes a change in the dynamic grid element 304.

In some embodiments, each container 306 in a dynamic grid element 304 has the same aspect ratio. In some embodiments, containers 306 may have different aspect ratios within a dynamic grid element 304. Bounding box 308 and handles 310 may be provided for the customizing user to resize a container 306. In some embodiments, containers 306 are assigned an identifier such that the unique aspect ratio of a container 306 may be stored. For example, the fourth container 306 in a dynamic grid element 304 may have a unique aspect ratio, and when a fourth participant joins the video live stream, causing a fourth containers 306 to be added to the dynamic grid element 304, the fourth instance of dynamic grid element 304 may be created with the unique aspect ratio. As discussed further below, in some embodiments, users can be assigned to specific containers 306 and/or be given priority to containers 306. Accordingly, it is contemplated that a unique aspect ratio for a container 306 can be set and enacted only when a specified participant joins the live stream. If the specified participant does not join the video live stream, the containers 306 may maintain the default aspect ratio.

In some embodiments, dynamic grid toolbar 312 further comprises preview 324. Preview 324 may be used to generate a preview of participants within containers 306 such that the editing user 222 can view how the dynamic grid element 304 may look during the live stream. For example, as shown, eight placeholder participants are displayed in the eight containers 306. Accordingly, editing user 222 may adjust the dynamic grid element 304 and the various settings described above (e.g., grid type and alignment, etc.) to generate various previews of iterations of dynamic grid element 304 before initiating the video live stream. The preview 324 can then be used to change the number of containers 306 in the dynamic grid element 304 such that the user can view how the dynamic grid element 304 may look with more or fewer containers. While the preview is illustrated with participants in each container 306, in some embodiments, the preview can display other types of media as a preview. For example, editing user 222 may assign a container 306 for streaming data from a third party integration, and a preview of the third party integration may be displayed in the container 306 as a preview.

In some embodiments, the editor interface 300 is accessible before, during, and after the end of a video live stream. Thus, in some embodiments, editor interface 300 may be used to adjust the video stream layout during a live stream. Accordingly, in some embodiments, preview 324 may display a preview that shows both real participants and placeholder participants (or other data streams) in a container 306. For example, if a dynamic grid element 304 is configured for four live stream participants, and only two of the participants have joined the live stream, a preview may be generated that displays the live video stream from the two joined participants, while placeholder participants may be displayed in the other two containers 306. By a placeholder participant, it is meant that a graphical representation of a participant (e.g., a stock avatar or other imagery) is rendered in the containers 306 to give a representation of how the container 306 will look when a real participant joins the video live stream and is assigned to the container 306.

In some embodiments, editing user 222 can assign participants, integrations, or any other data displayed in a container 306 a priority level via priority 326. The priority may indicate an access level and/or an order for which a participant may be assigned to a container 306. For example, editing user 222 may wish to have a presenter for the video live stream displayed in a central container 306 within the dynamic grid element 304. Accordingly, editing user 222 may assign the presenter to the central container 306 such that the presenter has priority for the container 306. Further, the participant may switch containers 306 during the video live stream based on the priority. For example, if a participant is given priority to a center container 306, the container 306 assigned to the participant may change as the dynamic grid element 304 changes during the video live stream. For example, the priority participant may be displayed in a middle container 306 of three containers in a horizontal grid configuration (see, e.g., fourth dynamic grid element 304d' in FIG. 3B). If two new participants join the video live stream such that two new containers 306 are provisioned, the priority participant may be moved to the new center container 306 (i.e., the third container 306 from the right in fourth dynamic grid element 304d''') such that the priority participant remains in the center of the dynamic grid element 304.

Similarly, in some embodiments, participants or other data streams can be assigned to a specific container 306. For example, each of the participants may be assigned to a container 306. Accordingly, in some embodiments, the dynamic grid element 304 is displayed with empty containers 306 if an assigned participant has not yet joined. For example, if the participant assigned to the fourth container 306 joins before the participants assigned to the second and third containers 306 have joined, the dynamic grid element 304 may be expanded to display four containers 306, with the second and third containers 306 left empty until the assigned participants join the video live stream. It is contemplated that empty containers 306 may be configured to render placeholder UI elements, such as placeholder participants, animations, integrations, text, or the like. For example, the names of the assigned participants may be displayed.

In some embodiments, the assignment of a participant to a container 306 prevents any other participants from joining the container 306 regardless of whether the assigned participant has joined the video live stream. For example, a dynamic grid element 304 may be configured for only a single container 306 that is assigned to a specific participant. Accordingly, until the assigned participant joins the video live stream, the containers 306 in the dynamic grid element 304 may remain empty. As discussed above, in some embodiments, placeholder information is displayed in an empty container 306. In some embodiments, one or more instances of dynamic grid element 304 are hidden from the video stream layout if no containers 306 are currently streaming data. For example, if the assigned participant for the single container 306 has not yet joined the video live stream, the dynamic grid element 304 may be hidden until the assigned participant joins the live stream. In some embodiments, participants may be removed from a container 306 that is assigned to a participant upon the participant joining the video live stream.

In some embodiments, containers 306 may be associated with a unique URL. Thus, in some embodiments, containers 306 can be assigned to a participant by only sending the assigned participant the unique URL for the container 306. The unique URL may be generated as part of a meeting invite sent to the participants, for example. In some embodiments, the virtual event hosting platform is configured to store priority state in a web browser (e.g., using cookies) such that participants may enter and leave the video live stream while maintaining the priority to the containers 306. In some embodiments, participants can be given a custom login to the video live stream that is associated with a container 306 that the participant has been assigned.

In some embodiments, containers 306 themselves can be assigned a priority. For example, editing user 222 may configure a dynamic grid element 304 with a default grid layout. Editing user 222 may desire to add fill out a row in the grid before adding a new row. Thus, if the dynamic grid element 304 is configured such that eight containers 306 will make up a 2 rows by 4 columns grid, editing user 222 may assign the containers 306 in the first row a first priority level and the containers 306 in the second row a second priority level lower than the first priority level. Accordingly, as participants join the video live stream and are assigned to containers 306, the first row will be filled before a new row is created in the dynamic grid element 304.

As previously discussed, in some embodiments, a repository 226 is provided for storing and/or retrieving customized interface templates. Accordingly, in some embodiments, download/upload 328 may be provided for uploading/downloading customized interfaces and/or dynamic grid elements to repository 226. Thus, an editing user 222 may create a customized instance of dynamic grid element 304 and upload the customized instance of dynamic grid element 304 to repository 226 for other users to use in their custom interfaces. Likewise, the editing user 222 may download the customized instance of dynamic grid element 304 generated by other users that have been uploaded to repository 226.

Along with dynamic grid element 304, various other instances of UI element 302 may be added to the video stream layout. Other examples of UI elements 302 that may be added include overlays 330, integrations 332, backgrounds 334, and video window 336. Overlays 330 may include UI elements configured to be rendered over another UI element. For example, an overlay 330 may be applied to or otherwise associated with a container 306, and the overlay 330 may have one or more UI elements rendered over the containers 306. In some embodiments, overlays 330 provides a plurality of UI elements 302 for adding branding to the video stream layout. For example, branding may include logos, banners, and the like for customizing the video stream layout. For example, a company may host a stand up meeting and add branding UI elements to display the company's logo in the video stream layout. In some embodiments, overlays 330 can be animated.

In some embodiments, the overlay 330 is disposed on a layer above the layer that containers 306 are located, and overlays 330 may comprise a transparent portion such that the container 306 is visible underneath the transparent portion. An exemplary overlay 330 is shown with respect to FIG. 4A. As another example, overlays 330 may be added to mask containers 306 in order to adjust a shape of the container 306. For example, an overlay 330 may be configured with a circular cutout such that, when the overlay 330 is added to the interface over a rectangular container 306, the container 306 may instead be rendered as a circle. It will be appreciated that overlays 330 may be associated with specific containers 306 such that overlays 330 move dynamically along with their associated containers 306. Further details on overlays 330 can be found in commonly-owned U.S. patent application Ser. No. 17/734,880, entitled "DYNAMIC OVERLAY ELEMENTS FOR A VIDEO COMMUNICATION SESSION", the entirety of which is incorporated by reference herein.

UI elements 302 may also comprise integrations 332. As discussed above, various integrations 332 may be added to the video stream layout to add further functionality thereto. In some embodiments, integrations 332 can be added to the video stream layout and positioned at any location in the interface. In some embodiments, integrations 332 can be assigned to one or more containers 306 in a dynamic grid element 304 such that the integration content is displayed in the container 306. For example, a polling integration may be assigned to a 306 that allows for polls to be conducted during the video live stream. As another example, chat integrations may be added to provide chat functionality during the video stream. In some embodiments, the chat integration allows for pinning of one or more chat messages within the video stream layout. For example, a chat may be pinned to an area of a container 306. Other integrations include, but are not limited to, a collaborative document, an automatic captioning service, a virtual white board, a video recording integration, a Q&A integration, a ticketing system integration, and a meeting summary integration. In some embodiments, the integrations 332 are provided by a third party service and integrated with the video live stream. In some embodiments, the integrations 332 are provided by the live streaming platform.

In some embodiments, UI elements 302 further includes backgrounds 334. As discussed previously, a background 334 may be added to video stream layout. The background 334 may be a static image, an animated image, or any other type of background. In some embodiments, the background

334 is automatically placed on the lowermost layer. In some embodiments, backgrounds 334 can be placed on any layer. UI elements 302 may further include a video window 336. The customizing user may add a video window 336 to the video stream to display a video feed from a live stream participant. Differing from the dynamic grid element 304, the video window 336 may not change during the video live stream if a participant leaves the video stream. The video window 336 may also be configured to render data from other sources, such as sharing screen share data.

Figure 3B:
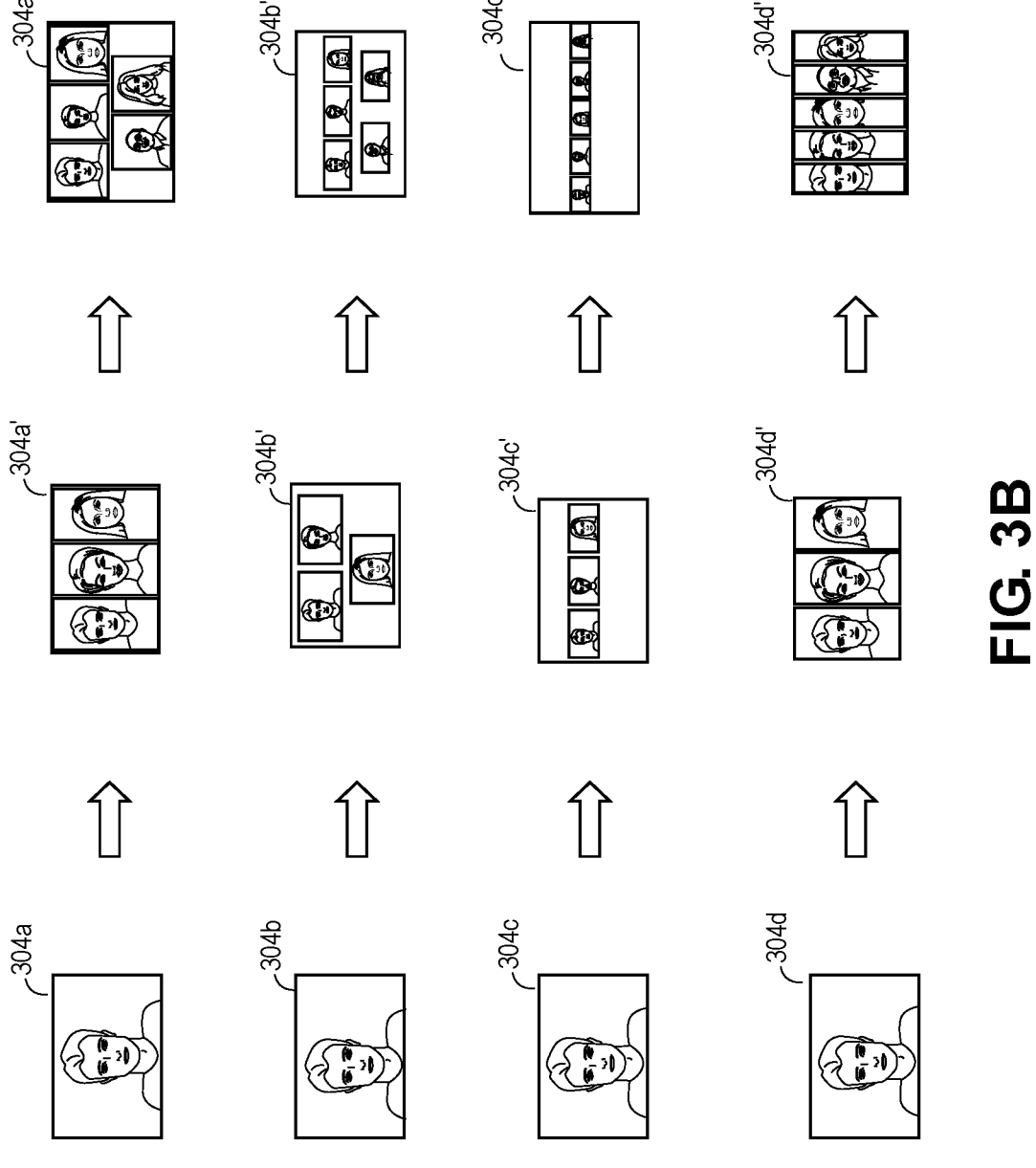
FIG. 3B illustrates exemplary changes to a dynamic grid element of the video live stream interface for some embodiments of the present disclosure.

FIG. 3B illustrates a few exemplary changes in a dynamic grid element 304 based on newly-added containers 306. As discussed above, dynamic grid elements may be arranged in a default grid layout, a horizontal layout, or a vertical layout, and may have containers 306 set to a fit configuration or a fill configuration. Various examples of how a dynamic grid element 304 may adjust to newly-added containers 306 based on the grid layout and the fit or fill settings are displayed with respect to FIG. 3B.

A first dynamic grid element 304a illustrates a grid fill embodiment of a dynamic grid element. First dynamic grid element 304a is shown in a first state in which the first instance of dynamic grid element 304 comprises a single container 306. As discussed above, as participants join a video live stream, new containers 306 may be provisioned for the dynamic grid element 304. Modified first dynamic grid element 304a' illustrates the first dynamic grid element 304a modified to include three containers 306. As shown, the size of the containers 306 has been adjusted to fill the containers 306 within the boundaries of the first dynamic grid element 304a. Likewise, further modified first dynamic grid element 304a'' shows the first dynamic grid element 304a with seven containers 306. Here, the containers 306 have been resized in a grid arrangement (as opposed to the horizontal arrangement shown in modified first dynamic grid element 304a'). Note that the dimensions of first dynamic grid element 304a have not changed, instead, the size of containers 306 change as new containers 306 are added.

A second dynamic grid element 304b, in contrast to first dynamic grid element 304a, shows a grid fit embodiment in which containers 306 maintain an aspect ratio as new containers 306 are added. Modified second dynamic grid element 304b' shows second dynamic grid element 304b with two containers added, and further modified second dynamic grid element 304b'' shows second dynamic grid element 304b with six containers 306 added. As compared to the grid fill, modified first dynamic grid element 304a' and further modified first dynamic grid element 304a'', in the grid fit, modified second dynamic grid element 304b' and further modified second dynamic grid element 304b'' maintain an original aspect ratio, and the video stream is not cropped.

Third dynamic grid element 304c, third dynamic grid element 304c', and third dynamic grid element 304c'' illustrates how a horizontal fit dynamic grid element may change as containers 306 are added. As can be seen, the containers 306 are arranged in a horizontal row and maintain the original aspect ratio of the third dynamic grid element 304c. Fourth dynamic grid element 304d, fourth dynamic grid element 304d', and fourth dynamic grid element 304d'', in contrast, illustrate how a horizontal fill dynamic grid element may change as containers 306 are added. As can be seen, as new containers 306 are added, the other containers 306 may be cropped to generate space for the new containers 306 to fit within the fourth dynamic grid element 304d. While not shown, it will be appreciated that the vertical layout fit/fill configurations may fill similarly to the horizontal fit/fill configurations but in a column instead of a row.

Figure 4A:
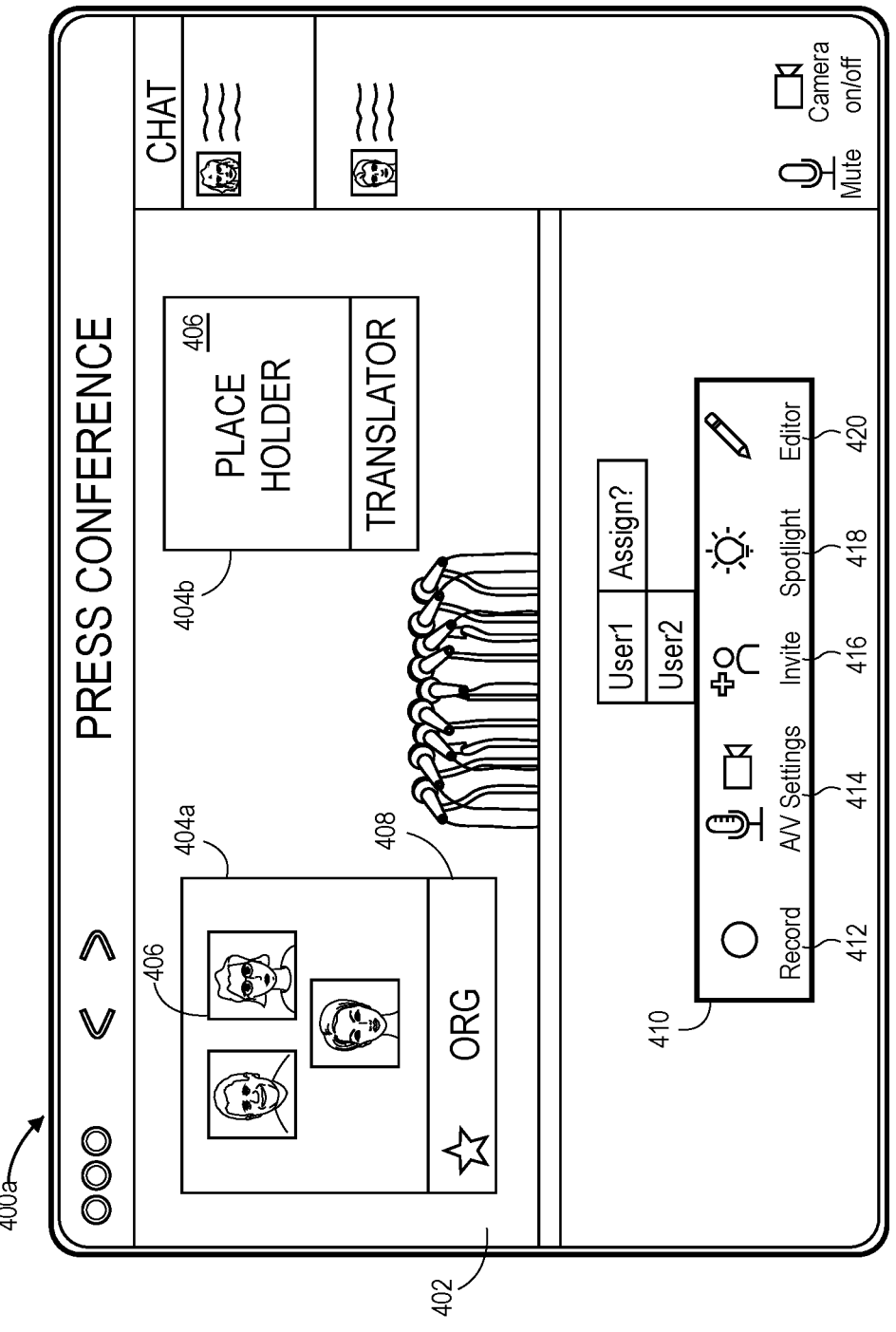
FIG. 4A illustrates a first video live stream interface for some embodiments of the present disclosure.

FIG. 4A illustrates an exemplary user interface 400a for a video live stream in accordance with embodiments of the present disclosure. User interface 400a depicts a video stream layout as may be generated by editing user 222 using editor interface 300 for some embodiments of the present disclosure. As shown, exemplary user interface 400a comprises background 402, a first dynamic grid element 404a, and a second dynamic grid element 404b. Dynamic grid elements 404a, 404b may correspond to dynamic grid element 304 described above. In the exemplary interface shown in FIG. 4A, first dynamic grid element 404a comprises three containers 406, while second dynamic grid element 404b comprises a single container 406.

First dynamic grid element 404a illustrates an example use case in which containers 406 may be dynamically added to a dynamic grid element, while second dynamic grid element 404b illustrates an exemplary use case in which a dynamic grid element may have a single container 406 reserved for a specified participant. For example, the video live stream may be for a virtual press conference, panel interview, or the like, and the participants in first dynamic grid element 404a may be fielding interview questions. Second dynamic grid element 404b may be reserved for a translator, for example, a person providing sign language translation for viewers. Accordingly, the single container 406 in second dynamic grid element 404b may be assigned to a specific user such that other participants joining the live stream cannot be added to the single container 406 in second dynamic grid element 404b. As discussed above, in some embodiments, a unique URL may be generated for the single container 406 and transmitted to the specified participant. The unique URL may then be used by the specified participant to join the video live stream, and the participant may be automatically added to the container 406 upon joining the video live stream using the URL.

As previously discussed, overlays may be added to dynamic grid elements in some embodiments. As shown, the first dynamic grid element 404a has an overlay 408. The overlay 408 comprises branding for the organization, such as the logo and the organization name as shown. In some embodiments, overlays 408 are dynamic such that the overlays 408 adjust along with each instance of the dynamic grid element 304. For example, if a container 406 is added to the first dynamic grid element 404a such that the size of first dynamic grid element 404a expands, overlay 408 may expand with first dynamic grid element 404a. Likewise, if first dynamic grid element 404a decreases in size, overlay 408 may decrease in size accordingly. As another example, if the layout of the first dynamic grid element 404a changes (either automatically or by user edit), overlay 408 may automatically adjust such that the editing user 222 does not have to manually reconfigure overlay 408.

Exemplary user interface 400a also depicts a toolbar 410 for configuring the video live stream during the video live stream for some embodiments of the present disclosure. In some embodiments, toolbar 410 comprises record 412, audio/video (A/V) settings 414, invite participants 416, spotlight 418, and editor mode 420. It will be appreciated that the tools depicted in toolbar 410 are not limited to being accessible in a toolbar 410 and may be accessed via any area of user interface 400a. Various other tools and options for controlling the video live stream may be provided. For example, camera toggle, microphone toggle, screen sharing, leave meeting, and other tools may be provided.

In some embodiments, record 412 provides for recording of the video live stream meeting. In some embodiments, recording is performed on or in association with capturing server 208 as discussed above. In some embodiments, only a host user has control of recording of the video live stream. In some embodiments, any user can initiate recording of the video live stream, which, in some embodiments, may require approval from the host user. In some embodiments, any dynamic grid element in a recorded video live stream can be modified to produce a modified recording. Generally, any modification of a dynamic grid element discussed herein can be made to a dynamic grid element in a recording. As one example, if a dynamic grid element is in a horizontal layout during the video live stream, the dynamic grid element may be changed to a vertical layout in the recording. As another example, containers may be rearranged within a dynamic grid element from the positioning of the containers during the video live stream. Similarly, it is contemplated that overlays 408 may be added to a dynamic grid element 404a in the recording even if the overlays 408 were not displayed during the video live stream.

Toolbar 410 may also comprise A/V settings 414 allowing a user to adjust audio and video settings during the live stream. In some embodiments, the A/V settings 414 are only accessible to a host user or other user with requisite permissions. In some embodiments, each participant can manage their own A/V settings 414. In some embodiments, the host user or user with requisite permissions can utilize A/V settings 414 to adjust the audio and/or video transmission for a participant in a single container 406 and/or for a dynamic grid element as a whole. For example, the A/V settings 414 may allow for the host user to increase an output volume of audio data from each container 406 in first dynamic grid element 404a. Lighting, volume levels, frame rate, resolution, and other audio and visual settings for adjusting media quality may be set for a single container or all containers in a dynamic grid element using A/V settings 414.

In some embodiments, toolbar 410 comprises invite participants 416. Invite participants 416 may be used to invite a participant to join the video live stream. In some embodiments, when inviting participants, an option is provided to assign the invited participant to a container 406. For example, invite participants 416 may be used to add user1 to first dynamic grid element 404a and assign user1 a specific container 406. Assignment of user1 to a container 406 may cause a participant to be removed from the assigned container 406. For example, when inviting user1 to join the video live stream, the user1 may be assigned (i.e., given priority) to the bottommost container 406 in first dynamic grid element 404a. Accordingly, when user1 joins the video live stream, the current participant in the bottommost container 406 may be moved to a new container 406 (or removed from first dynamic grid element 404a entirely), and user1 may take up the bottommost container.

In some embodiments, toolbar 410 further comprises spotlight 418. Spotlight 418 may be used to highlight or otherwise call out a container 406 in a dynamic grid element. For example, continuing with the press conference example, the spotlight 418 may be used to highlight the participant in first dynamic grid element 404a that is answering a question. In some embodiments, spotlight 418 is configured to call out a random container 406. For example, the host user may actuate spotlight 418 in toolbar 410 to highlight a random container 406. In some embodiments, spotlight 418 automatically highlights an active participant. The active participant may be the participant that is currently speaking. If multiple participants are speaking, spotlight 418 may highlight each participant, the participant who began speaking first, or the participant who began speaking last.

Toolbar 410 may also comprise editor mode 420. Editor mode 420 may be selected to cause display of editor interface 300. In some embodiments, the video stream interface may be adjusted during a video stream. When editing the video stream interface during a video live stream, participants currently streaming data in a container 406 may be shown in the preview mode displayed in editor interface 300 as discussed above. If the editing user 222 modifies a dynamic grid element to include more containers than there are participants currently streaming video, placeholder participants may be rendered in the containers such that editing user 222 can see a preview that mimics how the dynamic grid element will look with a participant in each single container 406.

Figure 4B:
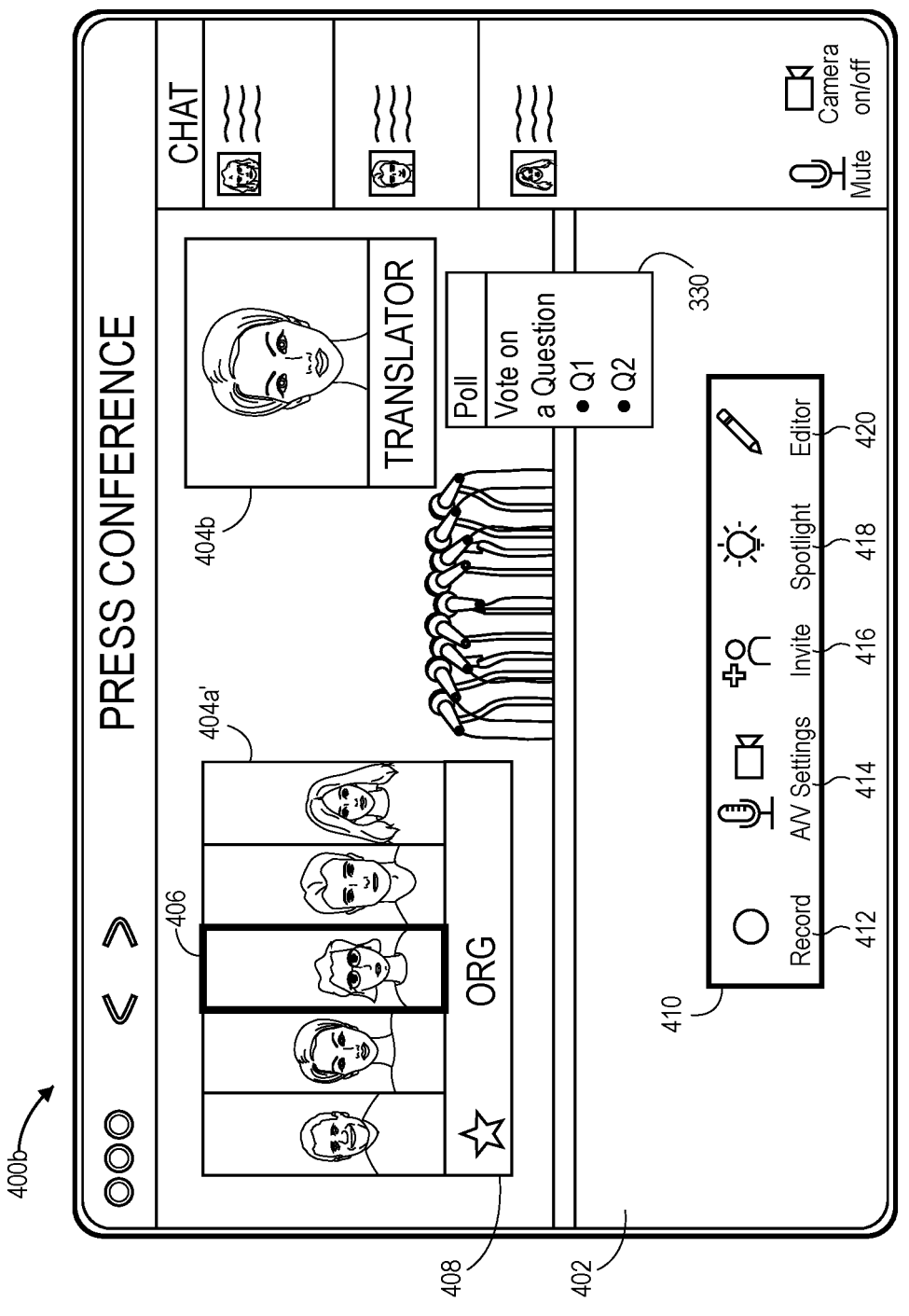
FIG. 4B illustrates a second video live stream interface for some embodiments of the present disclosure.

FIG. 4B illustrates a second user interface 400b in accordance with aspects of the present disclosure. Second user interface 400b illustrates how the video live stream interface may dynamically change throughout a video live stream based on participants joining and leaving the video live stream, among other factors that may cause a change to the video live stream interface. As shown, second user interface 400b includes the same press conference background as in exemplary user interface 400a. While the background is the same in exemplary user interface 400a and second user interface 400b, it will be appreciated that backgrounds (and other UI elements) may also be changed during the event using editor mode 420. Second user interface 400b also includes an integration 332 (in the form of a poll question) that has been added to second user interface 400b.

Second user interface 400b further includes an adjusted dynamic grid element 404a', along with second dynamic grid element 404b shown in FIG. 4A. Adjusted dynamic grid element 404a' has been dynamically modified to include two additional containers 406. Furthermore, adjusted dynamic grid element 404a' has changed from the grid layout shown in first dynamic grid element 404a to a horizontal layout. As previously discussed, dynamic grid elements may change grid types using editor mode 420, or automatically based on the dynamic grid element having an aspect ratio with a height or width that falls above or below a threshold value as discussed above. In some embodiments, the threshold value can be specified by editing user 222. In some embodiments, a transition is enacted (e.g., an animation is played) when the layout of a dynamic grid element changes to provide a smooth viewing experience for viewers. As shown, the overlay 408 for first dynamic grid element 404a has shifted along with the adjusted dynamic grid element 404a', such that the nameplate for the organization is still centered relative to the new bounds of the adjusted dynamic grid element 404a'.

In some embodiments, the transition is configured to reduce jarring movement and/or reordering of participants as participants are added to and removed from a dynamic grid element. For example, if a dynamic grid element has a vertical layout and is top-aligned, when a new participant is added to the dynamic grid element, the container for the topmost participant may be adjusted first, followed by the container directly below the topmost container, and so on. Once the existing containers have been shifted, the new container may be added to the dynamic grid element. Alternatively, the new container may be added first, and the existing containers may be shifted starting from the existing container directly above the new container and continuing to the topmost container. Accordingly, to a viewer watching the video live stream, the movement of the containers within the dynamic grid element is performed in a smooth manner that is not distracting to the viewer.

Likewise, for a horizontal layout, the containers may shift linearly based on the alignment. For example, if the horizontal layout is right aligned, the containers may be modified starting from the rightmost container and moving to the left before adding the new container. Alternatively, the new container may be added and then the modifications may occur beginning with the container to the right of the new container. When a grid layout is utilized, adjustments may be made in a snake pattern such that a first row of the grid is adjusted before an adjacent row is adjusted. One of skill in the art will appreciate that various techniques and sequences of adjusting containers within a dynamic grid element may be used to provide a smooth viewing experience to viewers and embodiments of the present disclosure are not limited to the aforementioned examples.

Adjusted dynamic grid element 404a' also illustrates a spotlighted container, which may be spotlighted using spotlight 418 as previously discussed. As shown, the container 406 is spotlighted by bolding the bounds of the container 406. Various other methods may be employed for spotlighting a container 406. For example, an overlay 408 may be applied to the container 406 to spotlight the container 406.

Second user interface 400b also illustrates second dynamic grid element 404b with a participant having joined the single container 406. As discussed, the single container 406 in second dynamic grid element 404b may have been reserved for the specific participant (e.g., by assigning the participant priority to the specific container 406). Accordingly, during the video live stream, once the specified participant joins the video live stream, the specified participant may be displayed in the reserved container 406 as shown. In some embodiments, when participants join a container, an animation may be played to spotlight the participant joining. Likewise, an animation may be played when a participant exits a container. In some embodiments, the animation is configured as an overlay 408.

FIG. 5A illustrates one example of a method 500 for rendering a video live stream interface having one or more dynamic grid elements in accordance with some aspects of the present disclosure. Method 500 may begin at step 502 where a user may add a dynamic grid element 304 to a video live stream interface. In some embodiments, the user is an editing user 222 having permissions to modify a video live stream interface for a video live stream. For example, the editing user 222 may be the video live stream host, or a moderator of the video live stream that has been granted authorization to edit the video live stream interface.

Next, at step 504, user configuration of the dynamic grid element 304 may be received. In some embodiments, the user configuration comprises the editing user 222 specifying a grid layout, such as a default grid layout, a horizontal layout, a vertical layout, a Masonry grid layout, or any other layout type. In some embodiments, the user configuration comprises the editing user 222 specifying an alignment for the containers 306 in the dynamic grid element 304. The alignment may be a left align, right align, center align, top align, bottom align, or any other type of alignment. The user configuration may also comprise receiving a selection of a fit configuration or a fill configuration for the dynamic grid element 304 as previously discussed. Various other user configurations of the dynamic grid element may also be received at step 504 as discussed with respect to embodiments described herein.

Next, at step 506, a preview may be presented to the editing user 222. In some embodiments, the preview is presented concurrently with the changes made to the dynamic grid element and to other portions of the video live stream interface to reflect the changes in real time. As previously mentioned, when configuring a dynamic grid element, the editing user 222 can add placeholder participants to a container 306 of the dynamic grid element 304 to preview how the dynamic grid element 304 may look when rendered during the video live stream interface.

At step 508, the video live stream may be initiated. Once the video live stream is initiated, the participants may begin to stream video and audio data for the video live stream. In some embodiments, the video live stream may be initiated upon the editing user 222 exiting editor interface 300. In some embodiments, an instruction to initiate the video live stream is received.

At step 510, a participant join may be detected. The participant join may be detected in various ways. In some embodiments, users are distinguished between live stream participants and live stream viewers. A live stream participant may be a user having authorization to transmit audio and/or video data as part of the video live stream. By contrast, a live stream viewer may be a user without authorization to transmit audio and/or video data as part of the video live stream. Video live stream viewers may be promoted to participants and vice versa. Accordingly, in some embodiments, a request from a viewer to transmit audio and/or video data may be considered a detection of a participant join. The request may require approval in some embodiments. In some embodiments, participant join is detected upon a participant joining the video live streaming via the unique URL. In some embodiments, the participant join is detected when an authorized user (e.g., live stream host, moderator, etc.) elevates a viewer to be a participant. In some embodiments, the participant join is detected when a user invites another user to join the video live stream as a participant.

At step 512, responsive to the detection of the participant join, the dynamic grid element may be modified to include a new container for the newly-joined participant. The modification to the dynamic grid element may be based on the various user configurations of the dynamic grid element received at step 504. For example, if the dynamic grid element has a horizontal layout, the new container may be added as the next container in the row. Likewise, if the dynamic grid element has a vertical layout with a top alignment, the new container may be added below the lowermost container in the column of containers.

Next, at test 514, it may be determined whether the aspect ratio (AR) of the dynamic grid changed relative to a threshold. If yes, processing may proceed to step 516. If no, processing may proceed to step 518. At step 516, the layout of the dynamic grid element may be changed. For example, for a grid layout, if a width of the dynamic grid element increases such that the aspect ratio exceeds a 19:3 aspect ratio (i.e., yes at test 514), the dynamic grid element may automatically be transitioned to a horizontal layout. As another example, if the grid layout increases in height such that the aspect ratio has a width below a 10:21 aspect ratio, the grid layout may transition to a vertical layout, and the containers in the dynamic grid element rearranged accordingly.

At step 518, the dynamic grid element may be displayed within the video live stream interface. Participants in the containers of the dynamic grid element may then stream their audio and/or video data as part of the video live stream. As discussed in accordance with embodiments herein, the dynamic grid element may have an overlay associated therewith that may display various information, such as a nameplate for the dynamic grid element. The overlay may also display integration data from integrations 332. For example, it is contemplated that a comment from the video live stream chat may be pinned to a dynamic grid element via the overlay.

Next, at step 520, a participant leaving the video live stream may be detected. In some embodiments, the participant leaving the video live stream is detected when the participant disconnects from the WebRTC session. In some embodiments, the participant leaving the video live stream is detected when the participant transitions to a viewer state.

Thereafter, at step 522, the dynamic grid element may be modified. In some embodiments, the modification comprises removing the container and rearranging the remaining containers based on the dynamic grid element settings. In some embodiments, if the layout of the dynamic grid element was changed at step 516, and the removal of the container changes the aspect ratio of the container relative to the threshold such that the modified dynamic grid element would not pass test 514 (i.e., no at test 514), the modified dynamic grid element may be changed back to the original layout. When dynamic grid elements are modified, any overlay associated therewith may be adjusted accordingly. For example, the overlay may be resized to match a new size of the modified grid element. In some embodiments, modifying the dynamic grid element does not include removing a container from the dynamic grid element. Rather, in some such embodiments, a new participant may be added to the dynamic grid element to replace the leaving participant.

Lastly, at step 524, the modified dynamic grid element may be rendered in the video live stream interface based on the modifications made at step 522. It will be appreciated that the steps of method 500 may occur in various orders and are not limited to the order presented in the flow chart. For example, after a participant leaves or enters the video live stream, processing may proceed back to step 504 if editing user 222 opens editor interface 300 via editor mode 420 (or any other method).

Figure 5B:
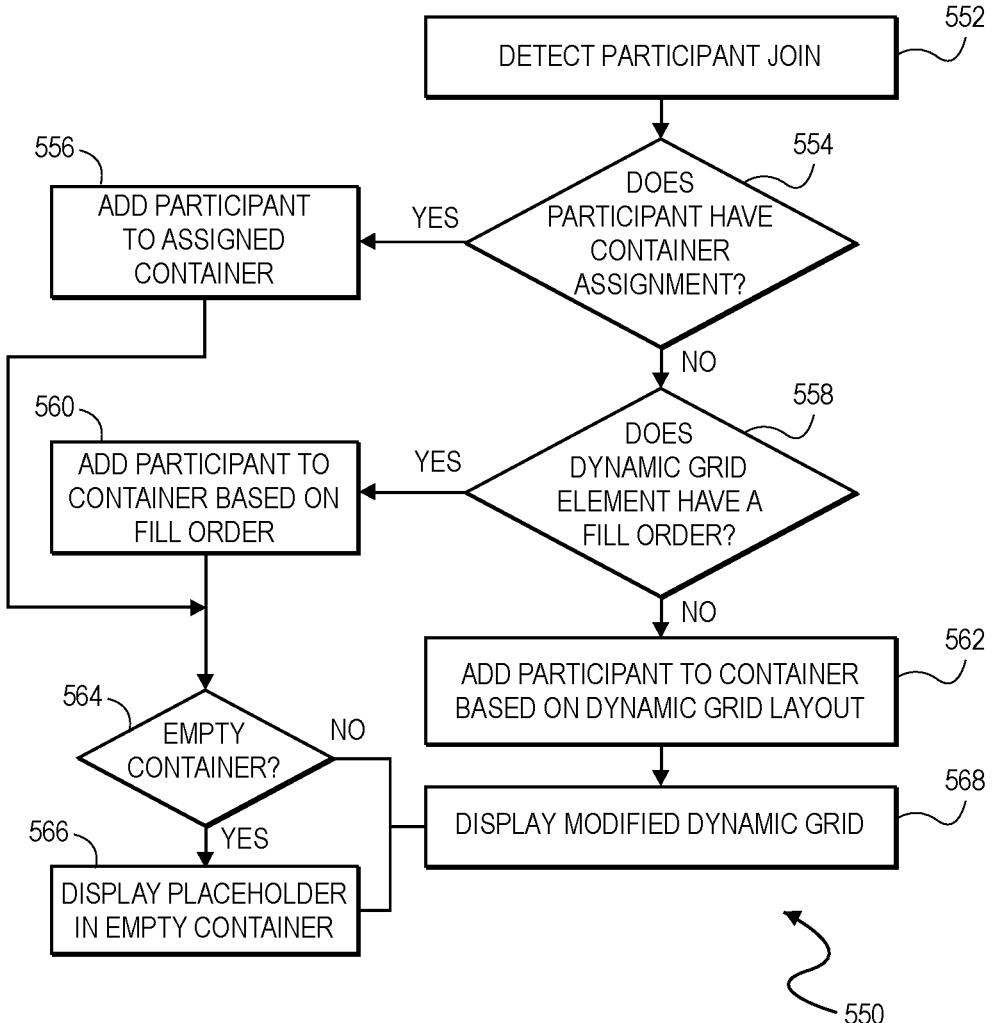
FIG. 5B illustrates an exemplary method for assigning a joining participant to a container of a dynamic grid element based on a priority for some embodiments of the present disclosure.

FIG. 5B illustrates a method 550 for adding participants to a dynamic grid element based on priority in accordance with embodiments of the present disclosure. As previously discussed, in some embodiments, participants may be given priority to a container and/or a dynamic grid element may have a fill order that may override the default adding of containers to the dynamic grid element. For example, a dynamic grid element with a horizontal layout may have a fill order specifying that containers should be filled from the outside in, rather than each new container expanding the width of the row.

Method 550 may begin at step 552 where a participant join is detected. Step 552 may correspond to step 510 discussed above. Next, at test 554, it may be determined whether the joining participant has a container assignment. Containers may be assigned by a host user or another authorized user. If yes, processing may proceed to step 556, and the participant may be added to the assigned container. Processing may then proceed to test 564, as discussed further below.

If the joining participant does not have a container assignment (no at test 554), processing may proceed to test 558, where it may be determined whether the dynamic grid element has a fill order. In some embodiments, the fill order defines which containers should be filled first. If the dynamic grid element has a fill order, processing may proceed to step 506, and the participant may be added to the container as defined by the fill order. Processing may then proceed to test 564, as discussed below. If the dynamic grid element does not have a fill order, processing may proceed to step 562. At step 562, the participant may be added to the next container in the dynamic grid element based on the layout. For example, for a vertical layout, the participant may be added to a container directly above or below a topmost or bottommost container.

As mentioned above, processing may proceed to test 564, from step 556 and step 560. At test 564, it may be determined whether an empty container was created as the result of adding the participant to an assigned container or adding the participant to a container based on the fill order. If yes, processing may proceed to step 566, and a placeholder, such as depicted in second dynamic grid element 404b, may be displayed in the empty container(s). For example, turning briefly back to FIGS. 4A and 4B, consider an example scenario in which the fifth participant, shown in the rightmost container 406 in adjusted dynamic grid element 404a', is assigned specifically to the fifth container in the row. Accordingly, if the fifth participant joins the video live stream prior to the fourth participant, the fifth participant may be displayed in the rightmost container, while the fourth container is displayed with a placeholder element. From step 562, or if no at test 564, or from step 566, processing may proceed to step 568, and the modified dynamic grid may be rendered with the newly-joined participant displayed in the container.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. One or more non-transitory computer-readable media storing computer executable instructions that, when executed by at least one processor, perform a method for rendering a video live stream interface having one or more dynamic grid elements, the method comprising:
  generating one or more uniform resource locators (URLs);
  transmitting a URL of the one or more URLs to each participant of a video live stream,
  wherein each URL of the one or more URLs are distinct and are uniquely associated with each participant and each URL is uniquely associated with each container of one or more containers of the video live stream,
  wherein each container is configured to display video data from each corresponding participant;
  storing a priority state of each container to maintain priority of each container for each corresponding participant:
  receiving, from a user, a first selection of a dynamic grid element to add to the video live stream interface;
  responsive to receiving the first selection, adding the dynamic grid element to the video live stream interface;
  receiving, from the user, a second selection of a layout for the dynamic grid element;
  initiating the video live stream;
  providing, by a first URL of the one or more URLs, for a first participant to join the video live stream;
  responsive to the first participant joining the video live stream, rendering first video data from the first participant in a first container of the dynamic grid element by the first URL based on the priority state of the first container;
  providing, by a second URL of the one or more URLs, access for a second participant to join the video live stream; and
  responsive to the second participant joining the video live stream:
    modifying the dynamic grid element within the video live stream interface to include a second container, wherein the dynamic grid element is modified based on the layout; and
    rendering second video data from the second participant in the second container based on the second URL.

2. The computer-readable media of claim 1, further comprising:
  responsive to one of the first participant or the second participant disconnecting from the video live stream:
    removing one of the first container or the second container from the dynamic grid element.

3. The computer-readable media of claim 1, further comprising receiving, from the user, a third selection of a size of the dynamic grid element.

4. The computer-readable media of claim 3,
  wherein modifying the dynamic grid element to include the second container comprises decreasing a prior size of the first container while maintaining a first aspect ratio of the first container to fit within the size of the dynamic grid element,
  wherein the second container comprises a second aspect ratio equivalent to the first aspect ratio.

5. The computer-readable media of claim 3, wherein modifying the dynamic grid element to include the second container comprises cropping the first container to fit within the size of the dynamic grid element.

6. The computer-readable media of claim 1, further comprising:
  receiving a third selection of a fill order for the dynamic grid element; and
  assigning the first participant and the second participant to the first container and the second container based on the fill order.

7. The computer-readable media of claim 1,
  wherein the layout comprises one of a horizontal layout, a vertical layout, or a grid layout, and
  further comprising receiving, from the user, a third selection of an alignment for the layout.

8. A method for rendering a video live stream interface having one or more dynamic grid elements, the method comprising:
  generating one or more uniform resource locator (URLs);
  transmitting one or more URLs to each participant of a video live stream,
  wherein each URL of the one or more URLs are distinct and are uniquely associated with each participant;
  receiving, from a user, a first selection of a dynamic grid element to add to the video live stream interface,
  wherein the dynamic grid element comprises a plurality of containers configured to render data from a data stream;
  responsive to receiving the first selection, adding the dynamic grid element to the video live stream interface;
  receiving, from the user, a second selection of a priority for a first participant to a container of the plurality of containers,
  storing a priority state of the container to maintain the priority of the container for the first participant, wherein the container is uniquely associated with a URL of the one or more URLs and assigns the first participant to the container, wherein the container is configured to display video data from the first participant;

rendering the video live stream by the video live stream interface;

responsive to the first participant joining the video live stream, adding the first participant to the container of the plurality of containers based on the priority and the URL associated with the first participant and the container; and rendering the video data for the first participant in the container.

9. The method of claim 8, wherein receiving user configuration of the dynamic grid element comprises receiving an alignment of the plurality of containers and a layout for the dynamic grid element.

10. The method of claim 9, wherein adjusting the dynamic grid element comprises resizing the dynamic grid element, wherein the dynamic grid element is resized based on the alignment of the plurality of containers and the layout for the dynamic grid element.

11. The method of claim 8, further comprising:

receiving an instruction to add an auxiliary data stream to a second container of the dynamic grid element, wherein the auxiliary data stream comprises one of: a screen share, a video feed, or an image; and responsive to receiving the instruction:

modifying the dynamic grid element to include the second container; and causing display of the auxiliary data stream.

12. The method of claim 8, further comprising:

responsive to receiving user configuration of the dynamic grid element, causing display of a preview for the dynamic grid element.

13. The method of claim 8, wherein adding the first participant to the container comprises removing another participant from the container.

14. A system for rendering a video live stream comprising one or more dynamic grid elements, comprising:

at least one data store; and at least one processor programmed to carry out computer-executable instructions, comprising:

generating one or more uniform resource locator (URLs);

transmitting a URL of the one or more URL to each participant of the video live stream, wherein the one or more URLs are distinct and are uniquely associated with each participant;

causing display of a video live stream interface, the video live stream interface comprising a dynamic grid element and at least one other user interface element, wherein the dynamic grid element comprises a first container, the first container configured to render data associated with a data stream from a first participant based on a first URL of the one or more URLs, wherein the first URL is uniquely associated with the first container and assigns the first participant to the first container, wherein the first container is configured to display a first data stream from the first participant;

storing a priority state of the first container to maintain priority of the first container for the first participant;

rendering the first data stream within the first container; and responsive to a second data stream being added to the video live stream:

adding a second container to the dynamic grid element based on a second URL of the one or more URLs, and rendering the second data stream in the second container based on the second URL of the one or more URLs distinct from the first URL, wherein the second URL is uniquely associated with the second container.

15. The system of claim 14, wherein the dynamic grid element comprises grid layout having at least one row of containers and at least one column of containers.

16. The system of claim 15, wherein the instructions further comprise:

responsive to the dynamic grid element having an aspect ratio with a height below a threshold height value, changing the grid layout to a horizontal layout.

17. The system of claim 15, wherein the instructions further comprise:

responsive to the dynamic grid element having an aspect ratio with a width below a threshold width value, changing the grid layout to a vertical layout.

18. The system of claim 14, wherein the instructions further comprise:

receiving, from a user, a selection of a media quality setting to apply to a container of the dynamic grid element; and responsive to receiving the selection, applying the media quality setting to each container in the dynamic grid element.

19. The system of claim 14, wherein the instructions further comprise:

after an end of the video live stream, receiving a modification to the dynamic grid element, and generating a recording of the video live stream, the recording comprising the modification to the dynamic grid element.

20. The computer-readable media of claim 1, wherein the method further comprises maintaining the priority state of the first container for the first participant when the first participant exits the video live stream.

* * * * *